US007023441B2

(12) United States Patent
Choi et al.

(10) Patent No.: US 7,023,441 B2
(45) Date of Patent: Apr. 4, 2006

(54) SHAPE DESCRIPTOR EXTRACTING METHOD

(75) Inventors: Yang-lim Choi, Kyungki-do (KR); Jong-ha Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 581 days.

(21) Appl. No.: 09/885,171

(22) Filed: Jun. 21, 2001

(65) Prior Publication Data

US 2002/0063718 A1 May 30, 2002

(30) Foreign Application Priority Data

Oct. 21, 2000 (KR) ............................... 2000-62163

(51) Int. Cl.
*G06T 11/20* (2006.01)
*G06K 9/46* (2006.01)
*G06K 9/44* (2006.01)

(52) U.S. Cl. ...................... 345/441; 345/443; 345/474; 382/190; 382/203; 382/259

(58) Field of Classification Search ........ 345/581–586, 345/441–443, 468–470, 471; 382/168, 170, 382/171, 190, 199, 200, 201, 202, 203, 254, 382/256, 258, 259, 266, 267, 291, 293, 295–299, 382/305, 218–219, 204; 707/3, 6
See application file for complete search history.

(56) References Cited

U.S. PATENT DOCUMENTS 4,573,197 A 2/1986 Crimmins .................... 382/22
4,881,269 A * 11/1989 Billiotte et al. ............. 382/147
5,267,328 A * 11/1993 Gouge ........................ 382/128
5,267,332 A * 11/1993 Walch et al. ............... 382/198
5,428,692 A * 6/1995 Kuehl ........................ 382/204
5,497,432 A * 3/1996 Nishida ...................... 382/178
5,684,940 A * 11/1997 Freeman et al. ............ 345/630
5,719,959 A * 2/1998 Krtolica ...................... 382/209
5,724,072 A * 3/1998 Freeman et al. ............ 345/648
6,005,976 A * 12/1999 Naoi et al. .................. 382/202
6,151,424 A * 11/2000 Hsu ........................... 382/294

(Continued)

FOREIGN PATENT DOCUMENTS

EP 1 058 458 12/2000

(Continued)

OTHER PUBLICATIONS

Japan Patent Office, Notice of Reasons for Rejection (for Patent Appl'n No. 2001-198699), Aug. 19, 2003, Japan.

(Continued)

*Primary Examiner*—Matthew C. Bella
*Assistant Examiner*—Wesner Sajous
(74) *Attorney, Agent, or Firm*—Sughrue Mion, PLLC

(57) ABSTRACT

A method for extracting from an image a shape descriptor which describes shape features of the image is provided. The shape descriptor extracting method includes: (a) extracting a skeleton from an input image, (b) obtaining a list of straight lines by connecting pixels based on the extracted skeleton, and (c) determining the regularized list of straight lines obtained by normalizing a list of straight lines as the shape descriptor. A shape descriptor extracted according to the shape descriptor extracting method possesses information of a schematic feature of a shape included in an image. Therefore, the shape descriptor extracting method effectively extracts a local motion in the data collection of the same category, and the number of extracted shapes is not limited to the number of objects.

16 Claims, 5 Drawing Sheets

U.S. PATENT DOCUMENTS

| | | | | |
|---|---|---|---|---|
| 6,529,635 | B1 * | 3/2003 | Corwin et al. | 382/243 |
| 2001/0020950 | A1 * | 9/2001 | Shimizu et al. | 345/611 |
| 2004/0076320 | A1 * | 4/2004 | Downs, Jr. | 382/139 |

FOREIGN PATENT DOCUMENTS

| | | | |
|---|---|---|---|
| JP | 401245371 A | * | 9/1989 |
| JP | 5-159065 | | 6/1993 |
| JP | 2000040147 | | 2/2000 |
| KR | 1997-0007718 | | 2/1997 |

OTHER PUBLICATIONS

Shigeyoshi Shimotsuji et al., Object Detection from Line Drawings based on Model-Guided Segmentation, Technical Report of IEICE, PRU94-37, Sep. 22, 1994, pp. 81-88, vol. 94, No. 242, The Institute of Electronics, Information and Communication Engineers, Japan.

Tadahiko Kimoto et al., A Method of Shape Description by a Distribution Function, The Institute of Electronics, Information and Communications Engineers, May 1993, pp. 1006-1014, vol. J76-D-II No. 5, The Institute of Electronics, Information and Communication Engineers, Japan.

Keiichi Abe, Description and Understanding of Shapes, The Journal of the Institute of Electronics, Information and Communication Engineers, May, 1994, pp. 507-514, vol. 77, No. 5, The Institute of Electronics, Information and Communication Engineers, Japan.

Fumikazu Kanehara et al., Flexible Image Retrieval Based on the Analysis of Shape and Structure, Transactions of Information Processing Society of Japan, Dec., 1995, pp. 2800-2810, vol. 36, No. 12, The Institute of Electronics, Information and Communication Engineers, Japan.

Koichi Emura et al., Recent Trends of MPEG-7 Standardization, The Journal of the Institute of Image Information and Television Engineers, Mar. 20, 2000, pp. 351-355, vol. 54, No. 3, The Institute of Image Information and Television Engineers, Japan.

Kimoto et al., "A Method of Shape Description by a Distribution Function," *The Institute of Electronic Information and Communications Engineers, Japan,*, vol. J76-D-11, No. 5, (May 1993), pp. 1006-1014.

Hitoshi et al., "MPEG7 Normalizing Trend," *Imaging Information Media Society Journal, Japan*, vol. 54, No. 3, (Mar. 2000); pp. 351-355.

XP000332031, P.E. Trahanias, "Binary Shape Recognition using the Morphological Skeleton Transform", Pattern Recognition, vol. 25, No. 11 pp. 1277-1288, 1992.

XP000369377, P.E. Trahanias, et al, "Morphological hand-printed character recognition by a skeleton-matching algorithm", Journal of Electronic Imaging, vol. 2, pp 114-125, 1993.

XP000012393, Ziheng Zhou, et al, "Morphological Skeleton Representation and Shape Recognition", International Conference on Acoustics Speech & Signal Processing, vol. Conf., 13, pp. 948-951, 1988.

XP004216270, W-Y Kim, et al, A region-based shape descriptor using Zernike mooments', Signal Processing, Image Communication, Elsevier Science Publishers, Amsterdam, NL, vol. 16, No. 1-2, pp. 95-102, 2000.

XP002173357, P. Dimitrov, et al, "Robust and efficient skeletal graphs", IEEE Conference on Computer Vision and Pattern Recognition, vol. 1, pp. 417-423, 2000.

XP000997596, A. Yamada, et al, MPEG-7 Visual part of experimentation Model Version 9.0,pp. 1-83, 2001.

* cited by examiner

FIG. 2A

| | | | | |
|---|---|---|---|---|
| −33 | −17 | 100 | −17 | −33 |
| −33 | −17 | 100 | −17 | −33 |
| −33 | −17 | 100 | −17 | −33 |
| −33 | −17 | 100 | −17 | −33 |
| −33 | −17 | 100 | −17 | −33 |

FIG. 2B

| | | | | |
|---|---|---|---|---|
| 100 | −15 | −25 | −35 | −45 |
| −15 | 100 | −15 | −25 | −35 |
| −25 | −15 | 100 | −15 | −25 |
| −35 | −25 | −15 | 100 | −15 |
| −45 | −35 | −25 | −15 | 100 |

FIG. 2C

| | | | | |
|---|---|---|---|---|
| −33 | −33 | −33 | −33 | −33 |
| −17 | −17 | −17 | −17 | −17 |
| 100 | 100 | 100 | 100 | 100 |
| −17 | −17 | −17 | −17 | −17 |
| −33 | −33 | −33 | −33 | −33 |

FIG. 2D

| | | | | |
|---|---|---|---|---|
| −45 | −35 | −25 | −15 | 100 |
| −35 | −25 | −15 | 100 | −15 |
| −25 | −15 | 100 | −15 | −25 |
| −15 | 100 | −15 | −25 | −35 |
| 100 | −15 | −25 | −35 | −45 |

SHAPE DESCRIPTOR EXTRACTING METHOD

BACKGROUND OF THE INVENTION

1. Field of the Invention

The present invention relates to a shape descriptor extracting method, and more particularly, to a shape descriptor extracting method based on an image skeleton. The present invention is based on Korean Patent Application No. 2000-62163 which is incorporated herein by reference.

2. Description of the Related Art

A shape descriptor is based on a lower abstraction level description enabling an automatic extraction, and is a basic descriptor which humans can perceive from an image. Algorithms, which describe the shape of a specific object within an image and measure the degree of matching or similarity based on the shape, are studied. However, the algorithms only describe the shapes of the specific objects, so that there are many problems in perceiving the shapes of general objects. Currently, shape descriptors, suggested by a standard group, such as MPEG-7, are obtained by looking for features through various transformations of the given objects to solve the above problem.

There are many kinds of shape descriptors. Two shape descriptors adopted in eXperimental Model 1 (XM) of MPEG-7 are known as a Zernike moment shape descriptor and a curvature scale space shape descriptor.

As for the Zernike moment shape descriptor, Zernike basis functions are defined for a variety of shapes to investigate the shape of an object within an image. Then, the image of fixed size is projected over the basis functions, and the resultant values are used as the shape descriptors.

As for the curvature scale space descriptor, the contour of a model image is extracted, and changes of curvature points along the contour are expressed on a scaled space. Then, the locations with respect to the peak values are expressed as a z-dimensional vector. However, to extract the former descriptor, the sizes of input images are restricted. Meanwhile, to extract the latter shape descriptor, the extracted shape must be only one object.

SUMMARY OF THE INVENTION

To solve the above problems, it is an objective of the present invention to provide a shape descriptor extracting method which can be effectively applied to a motion video compression technique and an image searching technique based on the motion video compression technique.

It is another objective of the present invention to provide an image searching method which searches an image similar to query images within images indexed, using shape descriptors extracted by the shape descriptor extracting method.

It is another objective of the present invention to provide a dissimilarity measuring method which measures dissimilarity between images to be indexed, using shape descriptors extracted by the shape descriptor extracting method.

Accordingly, to achieve the above objectives, there is provided a shape descriptor extracting method according to one aspect of the present invention including: (a) determining a shape descriptor based on an extracted skeleton by extracting a skeleton of images.

Also, to achieve the above objectives, there is provide a shape descriptor extracting method according to another aspect of the present invention including: (a) extracting a skeleton from input images; (b) obtaining a list of straight lines by performing a connection of pixels based on the extracted skeleton; and (c) determining a regular list of straight lines obtained by normalizing the list of straight lines as a shape descriptor.

Also, the step (a) preferably includes: (a-1) obtaining a distance map by performing a distance transform on input images; and (a-2) extracting a skeleton from the obtained distance map.

Also, the step (b) preferably includes: (b-1) thinning the extracted skeleton; and (b-2) extracting straight lines by connecting each pixel within the thinned skeleton.

Also, the step (c) preferably includes: (c-1) drawing out a list of connected beginning and end points; (c-2) obtaining a first list of straight lines by straight-combining extracted straight lines; and (c-3) determining a second list of straight lines obtained by normalizing the first list of straight lines based on a maximum distance between ending points of each straight line.

Also, the distance transform is preferably based on a function showing each point of the inside of an object as a value of a minimum distance from a background.

Also, the step (a-2) preferably includes: obtaining a local maximum from the distance map using an edge detecting method.

Also, the step (a-2) preferably includes: (a-2-1) performing a convolution using a local maximum detecting mask of four directions to obtain a local maximum.

Also, after the step (a-2-1), it is preferable to further include: (a-2-2) recording a level corresponding to a direction having the greatest size in a direction map and a magnitude map.

Also, it is preferable that the input images are binary images.

Also, it is preferable that the step (b-1) further includes: leaving the biggest pixel in the direction rotated by 90-degrees from the corresponding direction and removing the rest of the pixels.

Also, it is preferable that the step (c-2) further includes: drawing out a list of beginning and an end points of each line segment by connecting pixels having the same level in the direction map, using a direction map having four directions.

Also, it is preferable that the step (c-2) further includes: performing a straight line combination by changing a threshold value of an angle between each straight line, a distance, and a length of a straight line from the obtained first list of straight lines.

Also, it is preferable that the straight line combination is repeated until the number of remaining straight lines becomes equal to or less than a predetermined number.

Also, to achieve the above objectives, there is provided an image searching method according to the present invention which includes: (a) obtaining a list of straight lines from a shape descriptor of a query image; (b) obtaining dissimilarity by comparing a list of straight lines of a shape descriptor of a detected image with a list of straight lines of a shape descriptor of a query image.

Also, to achieve the above objectives, there is provided a dissimilarity measuring method, wherein a method for measuring dissimilarity between images indexed using a shape descriptor formed on the basis of a skeleton includes: (a) obtaining a list of straight lines from a shape descriptor of a query image; and (b) comparing a list of straight lines of a shape descriptor of a detected image with that of the shape descriptor of the query image, and obtaining dissimilarity.

BRIEF DESCRIPTION OF THE DRAWINGS

The above objectives and advantages of the present invention will become more apparent by describing in detail a preferred embodiment thereof with reference to the attached drawings in which:

FIGS. 2A through 2D are drawings illustrating examples of masks for detecting a local maximum;

DETAILED DESCRIPTION OF THE INVENTION

Hereinafter, preferred embodiments of the present invention will be described in greater detail with reference to the appended drawings.

According to the present invention, a shape descriptor using a skeleton is defined. The shape descriptor based on the skeleton is obtained by extracting a line, which is a basis of perception for humans, from a given shape, and by simplifying the extracted line. Particularly, according to the shape descriptor extracting method, the shape descriptor can be simplified by extracting a skeleton rather than an edge.

Figure 1:
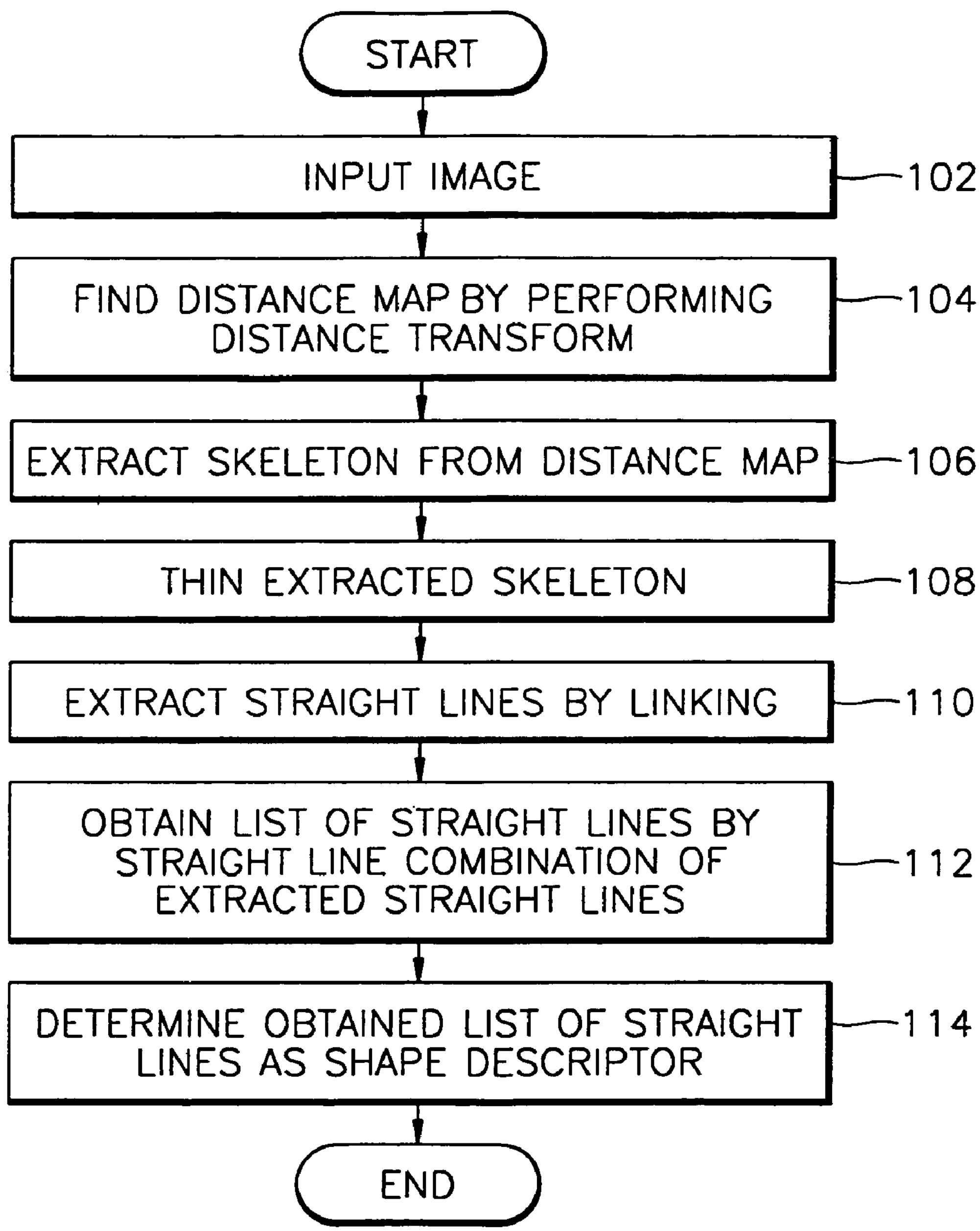
FIG. 1 is a flowchart illustrating main steps of extracting a shape descriptor according to a preferred embodiment of the present invention.
Figure 3A:
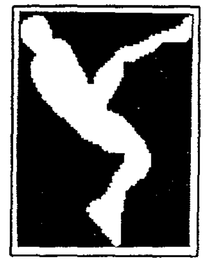
FIG. 3A is a drawing illustrating an example of a binary image.
Figure 3B:
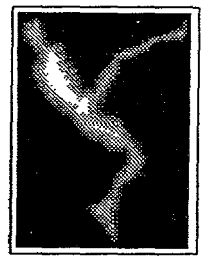
FIG. 3B is a drawing illustrating a distance map scaled from a black-and-white image.
Figure 3C:
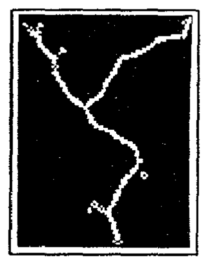
FIG. 3C is a drawing illustrating a skeleton image.

FIG. 1 is a flowchart illustrating the main steps of the shape descriptor extracting method according to a preferred embodiment of the present invention. Referring to FIG. 1, in the shape descriptor extracting method according to a preferred embodiment of the present invention, first, an image is input (step 102), and a distance transform is performed on the input image to obtain a distance map (step 104). The distance transform used to obtain the distance map uses a function which indicates respective points within an objective as the shortest distance value from the background. Next, a skeleton is extracted from the distance map (step 106). It is well-known that a local maximum in the distance map is a point of a skeleton. The distance transform used to obtain the distance map is based on a function which indicates respective points within an objective as the shortest distance value from the background. In a preferred embodiment, the local maximum in the distance map is determined as a skeleton by the distance transform. To obtain the local maximum from the distance map, in a preferred embodiment, it is possible to use an edge detecting method which is used in "Linear Feature Extraction and Description"(R. Nevatia and K. R. Babu, Computer Graphics and Image Processing, Vol. 13, pp. 257–269, 1980), incorporated herein by reference. FIGS. 2A through 2D illustrate examples of a mask for detecting the local maximum. Referring to FIGS. 2A through 2D, masks for detecting the local maximum of four-directions are used for detecting the local maximum. FIG. 2A is a mask corresponding to the direction of 0 degrees. FIG. 2B is a mask corresponding to the direction of 45 degrees. FIG. 2C is a mask corresponding to the direction of 90 degrees. FIG. 2D is a mask corresponding to the direction of 135 degrees. Then, a convolution is performed using the masks. As a result, a level corresponding to the direction having the greatest size is recorded on a direction map and a magnitude map. Hereby, the local maximum is obtained on the distance map obtained by the distance transform from the binary image illustrated in FIG. 3A, so that the skeleton is extracted.

Figure 3D:
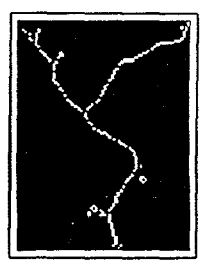
FIG. 3D is a drawing illustrating a thinned skeleton image.

Next, the extracted skeleton is thinned (step 108). The thinning can be performed by, for example, leaving a pixel having the greatest size in the direction rotated by 90-degrees from the corresponding direction on the direction map and removing the rest of the pixels. FIG. 3D illustrates an example of a thinned skeleton image.

Next, straight lines are extracted by connecting respective pixels within the thinned skeleton (step 110). That is, the respective pixels within the thinned skeleton are connected along one direction, and straight lines are extracted by making a list of starting and end points of the line. In a preferred embodiment, the direction maps of four directions illustrated in FIGS. 2A through 2D are used, and pixels having the same level on the direction map are connected to make a list of starting and end points of respective line segments.

Figure 3E:
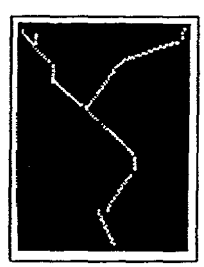
FIG. 3E is a drawing illustrating the result of a straight line approximation.

Next, a list of straight lines is obtained by straight line combination of the extracted straight lines (step 112). That is, changing threshold values of angle, distance, and length between respective straight lines from the obtained list of straight lines, the straight line combination is performed. The straight line combination is repeated until the number of remaining straight lines becomes equal to or less than the predetermined number. FIG. 3E illustrates the result of the straight line approximation. Then, a list of straight lines obtained by normalizing a list of straight lines based on a maximum distance between the ending points of respective straight lines is determined as a shape descriptor (step 114). That is, according to the shape descriptor extracting method, the skeleton of the binary image is extracted, and the extracted skeleton is used as the shape descriptor.

According to the shape descriptor extracting method, the skeleton of the binary image is extracted as the shape descriptor, and the extracted shape descriptor can be used for the combination of images. Also, in the shape descriptor extracting method, the skeleton is extracted from the binary image, and the extracted skeleton is approximated as a straight line. Also, to effectively extract straight lines, the binary image is distance-transformed, and the local maximum is obtained to extract the skeleton. The extracted skeleton is approximated as a certain number of straight lines using the edge extracting method. The number of approximated straight lines is limited to a certain number, so that it is possible to perform a further faster matching.

Hereinafter, a method for searching for images similar to query images from a database which stores images indexed by the shape descriptor extracting method will be described. Also, an effect of the shape descriptor extracting method will be described by evaluating the performance of searching for images similar to query images within the image database including images indexed using the shape descriptor extracted by the shape descriptor extracting method described with reference to FIG. 1.

Figure 4:
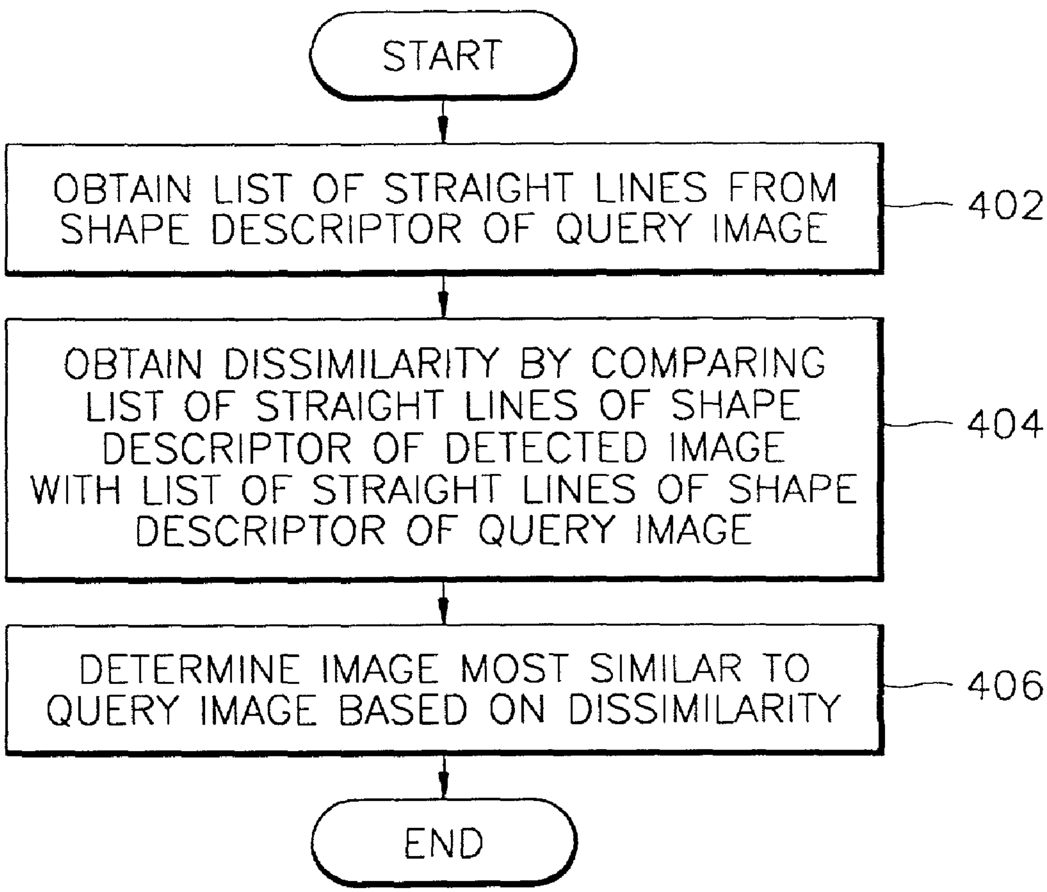
FIG. 4 is a flowchart illustrating the main steps of an image searching method based on a shape descriptor according to a preferred embodiment of the present invention.

FIG. 4 is a flowchart illustrating the main steps of the image searching method according to the present invention. First, a list of straight lines is obtained from the shape descriptor of the query image (step 402). Next, dissimilarity is obtained by comparing the list of straight lines of the shape descriptor of the detected image with that of the shape descriptor of the query image (step 404).

In the preferred embodiment, the distances between the ending points of the straight lines forming the skeleton are measured, and the sum of the minimum values of the measured distances is determined as a dissimilarity value. In a dissimilarity specific function, when N, $D_{1k}$, and $D_{2k}$ are respectively, $$N=\min\{N_{Q,NM}\} \tag{1}$$

$$D_{1k} = \min_{ij}\{\|Q_{S_i} - M_{S_j}\| + \|Q_{E_i} - M_{E_j}\|\} \tag{2}$$

$$D_{2k} = \min_{ij}\{\|Q_{S_i} - M_{E_j}\| + \|Q_{E_i} - M_{S_j}\|\} \tag{3}$$

$$D = \sum_{k=0}^{V-1} \min\{D_{1\lambda}, D_{2k}\} \tag{4}$$

Here, Q denotes a straight line to be detected, M denotes a detected straight line, S denotes a starting point of each straight line, E is an ending point of each straight line, $N_Q$ is the total number of straight lines which the shape descriptor of the query image has, $N_M$ is the total umber of straight lines which the shape descriptor of the detected image has.

Referring to formula 4, the sum of the minimum value of the distances between straight lines measured by formulas 2 and 3 is determined as dissimilarity of two descriptors. That is, the smaller the result value of formula 4 is, the more similar two objects are regarded as being. Also, it is possible to obtain a value which does not change with respect to rotation by performing the measurement at a regular interval of a rotating angle.

Now, images having shape characteristics similar to the query image are searched for on the basis of dissimilarity obtained in the step 404. The image having the least dissimilarity with respect to the query image among the searched images, is determined as a final searched image. The searching method based on dissimilarity is called a matching method, and the final searched image is called a matched image.

To evaluate the performance of the method, a trial experiment is performed on the binary images used as experimental images of an experimental model (XM) version of MPEG-7 standard. Various threshold values for the straight line combination are experientially decided. The straight line combination is only performed at an angle of 30 degrees, and the distance between ending points of the two straight lines, which are straight line combined, is decided as 5% of the smaller value among the width and length of the real image, and the length of the straight line is neglected after the straight line combination is decided as 1% of the greater value among the width and length. Also, the threshold value increases by 10% at every repeated performance, and the number of the straight lines becomes equal to or less than 10.

Figure 5:
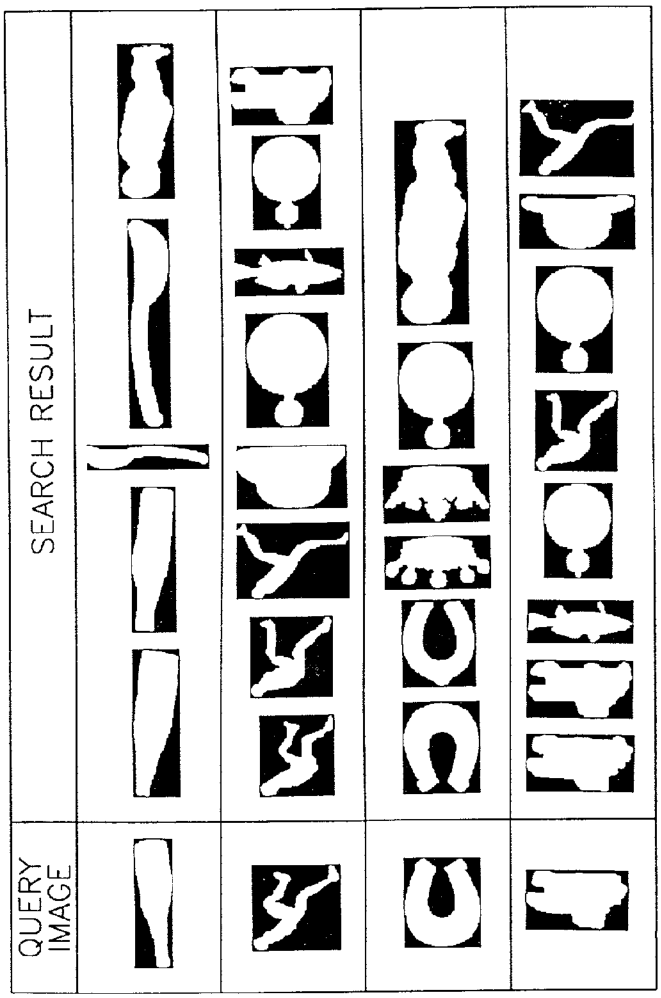
FIGS. 5 and 6 are drawings illustrating the results of trial experiments on binary images which are used as experimental images for an experimental model (XM) version of MPEG-7 standard in order to evaluate the performance of an image searching method according to the present invention.
Figure 6:
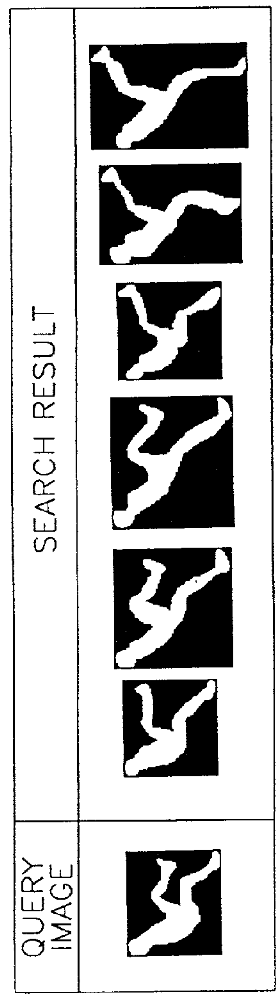

The result of the experiment is illustrated in FIGS. 5 and 6. Referring to FIG. 5, the image searching method according to the present invention does not show good searching performance when searching for images having a similar shape to the query image from the images which are not classified at all. This is because information of the detailed portion is lost during the approximation process for making the straight lines. Also, referring to FIG. 6, the image searching method shows very good searching performance when searching for the classified images, that is images having similar shape to the query image, from the data collection of the same category. Therefore, the shape descriptor extracting method is advantageous for extracting local motion in the data of the same category. The reason why the method is advantageous for extracting local motion of the same object is that the shape descriptor extracted by the shape descriptor extracting method of the present invention possesses information about schematic features of the shape included in the image.

In the above preferred embodiments, a method for searching for images, having a similar shape to the query image with respect to the is images indexed by the shape descriptor extracting method described with reference to FIG. 1, is described. However, in the image searching method, a step of measuring dissimilarity between the query image and the searched image can also be applied to grouping images having similar shapes on the basis of the measured dissimilarity.

The shape descriptor extracting method can be applied to a moving image compression technique on the basis of standards such as objective-based compression techniques, MPEG-4, MPEG-7, and MPEG-21. Also, it can be effectively applied to the image searching technique based on the motion video compression technique.

Also, the shape descriptor extracting method and image searching method according to the present invention can be written as a program executed on a personal or server computer. Program codes and code segments constructing the program can be easily inferred by computer programmers skilled in the art. Also, the program can be stored in computer-readable recording media. The recording media may be magnetic recording media, optical recording media, or radio media.

Since the shape descriptor extracted by the shape descriptor extracting method according to the present invention possesses information about schematic features of the shape included in the image, local motion can be effectively extracted in the data collection of the same category. Also, the image searching method, which searches for images having similar shapes to the query image within the image data base indexed by the shape descriptor extracting method, has very good searching performance when searching for images having similar shapes to the query image from the classified images.

What is claimed is:

1. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein (b) comprises connecting pixels having a same level on direction maps of a plurality of directions to obtain the first list of straight lines and pixels of the skeleton not having the same level on the direction maps of the plurality of directions are not connected.

2. The method of claim 1, wherein the step (a) comprises:

(a-1) obtaining a distance map by performing a distance transform on the input image; and (a-2) extracting the skeleton from the obtained distance map.

3. The method of claim 2, wherein the distance transform is based on a function indicating respective points within an object with the minimum distance value of the corresponding point from a background.

4. The method of claim 2, wherein the step (a-2) comprises: obtaining a local maximum from the distance map using an edge detecting method.

5. The method of claim 1, wherein the step (b) comprises:

(b-1) thinning the extracted skeleton; and (b-2) extracting the first list of straight lines by connecting respective pixels within the thinned skeleton.

6. The method of claim 1, wherein the step (b) comprises:

(b-1) making a list of starting points and ending points of the connected lines; and (b-2) obtaining the first list of straight lines by a straight line combination of the extracted straight lines;

and the step (c) comprises:

(c-1) determining the second list of straight lines, obtained by normalizing the first list of straight lines based on the maximum distance between ending points of respective straight lines, as the shape descriptor.

7. The method of claim 6, wherein the step (b-2) comprises:

performing a straight line combination by changing threshold values of an angle between the straight lines, a distance, and a length of a straight line from the obtained first list of straight lines.

8. The method of claim 7, wherein the straight line combination is repeated until the number of remaining straight lines becomes equal to or less than a predetermined number.

9. The method of claim 1, wherein the input image is a binary image.

10. The method of claim 1, wherein the step (a) comprises:

(a-1) obtaining a map of the input image; and (a-2) extracting the skeleton from the obtained map.

11. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein the step (a) comprises:

(a-1) obtaining a distance map by performing a distance transform on the input image; and (a-2) extracting the skeleton from the obtained distance map, the step (a-2) comprises: obtaining a local maximum from the distance map using an edge detecting method, and the step (a-2) comprises:

(a-2-1) performing a convolution using a local maximum detecting mask of four directions to obtain the local maximum.

12. The method of claim 11, after the step (a-2-1), further comprising:

(a-2-2) recording a level corresponding to a direction having the greatest size on a direction map and a magnitude map.

13. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein the step (b) further comprises:

(b-1) thinning the extracted skeleton; and (b-2) extracting the first list of straight lines by connecting respective pixels within the thinned skeleton, and the step (b-1) comprises:

leaving a pixel having the greatest size in a direction rotated by 90-degrees from the corresponding direction on the direction map, and removing the rest of the pixels.

14. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein the step (b) comprises:

(b-1) thinning the extracted skeleton; and (b-2) extracting the first list of straight lines by connecting respective pixels within the thinned skeleton, and the step (b-2) comprises:

using the direction map of four directions, and making a list of starting points and ending points of respective line segments by connecting pixels having the same level on the direction map.

15. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein (b) comprises connecting pixels having a same level on direction maps of a plurality of directions to obtain the first list of straight lines wherein (b) comprises using the direction map of four directions, and making a list of starting points and ending points of respective line segments by connecting pixels having the same level on the direction map.

16. A shape descriptor extracting method comprising:

(a) extracting a skeleton from an input image;

(b) obtaining a first list of straight lines by connecting pixels based on the extracted skeleton; and (c) determining a second list of straight lines obtained by normalizing the first list of straight lines as a shape descriptor, wherein (b) comprises connecting pixels having a same level on direction maps of a plurality of directions to obtain the first list of straight lines, wherein the direction maps of the plurality of directions comprise masks of the plurality of directions.

* * * * *